United States Patent [19]

Sakamoto

[11] Patent Number: 4,656,529
[45] Date of Patent: Apr. 7, 1987

[54] VIDEO SIGNAL RECORDING APPARATUS

[75] Inventor: Hitoshi Sakamoto, Kanagawa, Japan

[73] Assignee: Sony Corporation, Tokyo, Japan

[21] Appl. No.: 664,537

[22] Filed: Oct. 25, 1984

[30] Foreign Application Priority Data

Oct. 31, 1983 [JP] Japan .............................. 58-203961

[51] Int. Cl.⁴ ...................... H04N 5/783; G11B 21/10
[52] U.S. Cl. .................................. 360/10.2; 360/10.3; 360/77; 360/70
[58] Field of Search .................... 360/10.1, 10.2, 10.3, 360/36.1, 35.1, 14.1, 77, 109, DIG. 1, 70, 75, 84, 73

[56] References Cited

U.S. PATENT DOCUMENTS

| 3,878,477 | 4/1975 | Dias | 310/313 B |
| 4,093,885 | 6/1978 | Brown | 360/DIG. 1 |
| 4,257,073 | 3/1981 | Tatami | 360/DIG. 1 |
| 4,447,835 | 5/1984 | Smith | 360/10.2 |
| 4,471,392 | 9/1984 | Zorbalos | 360/10.2 |

Primary Examiner—Alan Faber
Attorney, Agent, or Firm—Lewis H. Eslinger; Alvin Sinderbrand

[57] ABSTRACT

Apparatus for recording a video signal to sequentially form a slant track on a recording tape which is moved at a specified tape speed, the specified tape speed being different from a standard tape speed in a reproducing mode is disclosed which includes a recording head mounted on a movable member which is deflected in a direction perpendicular to the slant track, a circuit for controlling the tape speed in response to a speed reference signal to obtain the specified tape speed during recording and a circuit for controlling a position of the recording head such that an inclination of slant track which is formed by the recording head at the specified tape speed will be equal to that of the slant track which is formed by the recording head at the standard tape speed.

8 Claims, 15 Drawing Figures

VIDEO SIGNAL RECORDING APPARATUS

BACKGROUND OF THE INVENTION

1. Field of the Invention

This invention relates to a video signal recording apparatus, and in particular, is directed to an apparatus for recording the video signal on a magnetic tape which is stopped or moved at slow speed.

2. Description of the Prior Art

In a VTR (video tape recorder), so far it has been requested that a tape speed can freely be varied so as to reproduce a slow or fast motion picture and the like as desired. For this, many improvements had been made and above all, the present inventors had previously proposed a dynamic tracking technique. In accordance with this dynamic tracking technique, it is possible that different speed reproductions are carried out at any desired different tape speeds to reproduce various different speed picture images.

However, considering the freedom at the recording side of the VTR, the recording side has almost no freedom in its time operation at present. For example, when some short recording portions are individually recorded and then composed or edited to one another to form a record tape on which the video signal is successively recorded, only the electronic edition technique for the VTR, namely, assemble and insert techniques are employed to cope with such recording. Naturally, the above technique requires complicated and troublesome procedures such as preroll, synchronization, framing (servo lock), review (check-playback) and so on.

More specifically, when a video signal of, for example, only one frame is required to record, it is necessary that a magnetic tape of the tape length exceeding several seconds is reciprocated, thus the mechanical stress against the magnetic tape being increased or the time loss beyond 10 seconds being caused. Under this restriction, when it is required that the video signal is recorded at every desired frame and the frame recording is composed for 10 seconds, the magnetic tape suffers the passing stress more than 600 times and a recording time of about 2 hours is necessary at present, assuming that the color frame synchronizing time and the minimum preroll time of the VTR are respectively selected as 5 seconds.

A further defect is that when the recording command is issued to record predetermined portion of the video signal, the VTR can not enter into the recording mode immediately but takes several seconds to several ten seconds. As a result, it is no exaggeration to say that a real time recording can hardly be performed.

Accordingly, it is very troublesome to use the for manufacturing a master tape of a video disc which is recently put into practical use, for recording an animation picture and a still picture file.

On the other hand, there has been already proposed different kinds of VTRs for the above purpose, wherein even if the quality of the recorded picture image is very poor, a video signal is recorded on the tape at a special tape speed and a special recording timing. One of the type of VTRs is provided with a rapid tape drive recording system which has been used once in a portaboe VTR for home use. According to the recording system, a similar recording pattern to the ordinary pattern will be obtained, if it is not necessary to take into consideration of synchronization and address identification. In this VTR, when the recording command is issued, a rotary capstan is instantly made in close contact with the tape to rapidly raise the tape speed to a standard tape speed, whereby the video signal is immediately recorded on the tape.

However, due to the tension fluctuation and speed fluctation of the tape, this type of VTR is unable to carry out the recording with high accuracy and is not free from the dropout of picture image, phase deviation, deterioration of picture quality and so on. Therefore, it is known that this VTR is only used for the simple type.

Another system is well-known as a so-called surveillance type of VTR. In the type of VTR a capstan is driven by a step motor to intermittently move a tape to thereby carry out the intermittent recording thereon. At that time, the angle of the tape around the drum is corrected by means of a movable tape guide or changing an inclination drum shaft.

However, since this system is difficult to keep its mechanical or constructive accuracy, the pattern of the slant track can not be made completely equivalent to that of the slant track which is formed at standard tape speed.

However, as far as the surveillance type of the VTR is concerned, it is sufficient that a picture image can be reproduced and viewed particularly when an abnormal phenomenon occurs in the observation. Therefore, the quality of the picture is of no importance in most case.

OBJECTS AND SUMMARY OF THE INVENTION

An object of this invention is to provide a video signal recording apparatus capable of surely recording a video signal on a tape at desired timing and desired tape speed.

In accordance with one aspect of this invention, a video signal is sequentially recorded by a recording head on slant tracks of a recording tape which is moved at a desired tape speed, such as stop mode or slow mode, and the recording head is mounted on movable member, such as a bimorph leaf, that can be displaced in a direction perpendicular to the slant track direction. A position of the movable menber is controlled by a control voltage such that an inclination of the slant track which is formed by the recording head at the desired tape speed will be equal to that of a standard slant track.

In the apparatus of the above-described type, a starting point, inclination and linearity of the slant track which is recorded by the recording head in the stop or slow mode must be exactly identical with the standard slant track. As is well known, the movable element comprising the bimorph leaf has a hysteresis characteristic peculiar to an electro-magnetic transducer. As a result, it is difficult to control the position of the head with high accuracy.

Accordingly, it is another object of this invention to provide an improved apparatus of the above-described type wherein the position of the head is controlled to form the exactly identical slant track to the standard slant track.

The other objects, features and advantages of the present invention will become apparent from the following description taken in conjunction with the accompanying drawings through which the like references designate the same elements and parts.

DESCRIPTION OF THE PREFERRED EMBODIMENT

Figure 1:
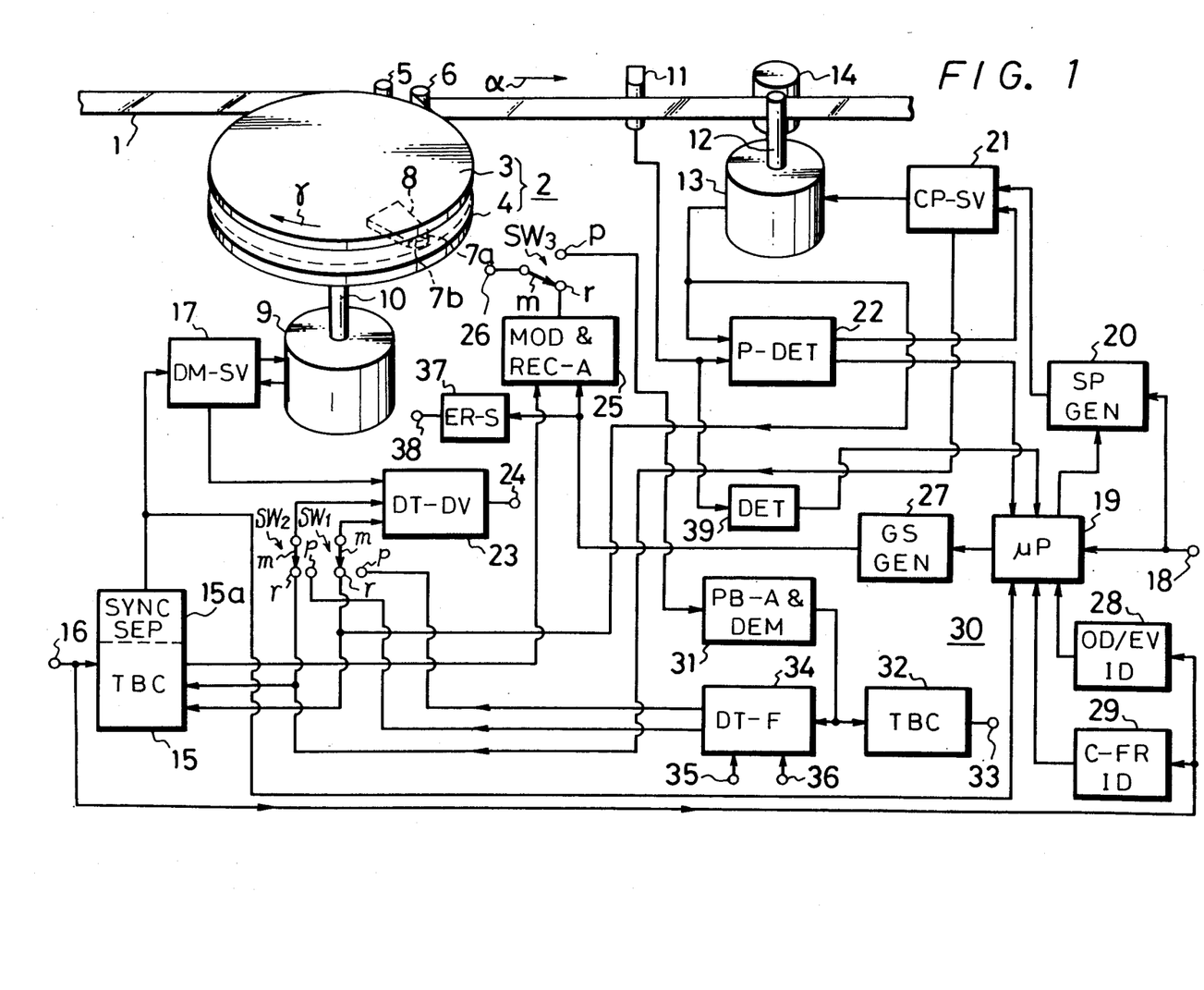
FIG. 1 is a block diagram showing a practical example of a video signal recording and reproducing apparatus.

Referring to FIG. 1, an embodiment of a video signal recording and reproducing apparatus (this apparatus is based on an SMPTE type C format VTR) according to this invention will be described in detail.

In FIG. 1, reference numeral 1 designates a magnetic tape which is obliquely wound around a tape guide drum 2 in Ω shape. Previously recorded on the side edge of the magnetic tape 1 is a control signal. A tape wrapping angle of the magnetic tape 1 around the tape guide drum 2 is approximately 360° and the wrapping state, namely, the wrapping inclination and the wrapping angle thereof are restricted by a pair of inclined guide pins 5 and 6.

The tape guide drum 2 consists of a rotary upper drum 3 and a fixed lower drum 4. Reference numeral 7a designates a record and reproduce rotary magnetic head and reference numeral 7b designates an erase rotary magnetic head. These magnetic heads 7a and 7b are mounted on the rotary upper drum 3 through a common electro-mechanical transducer element 8 such as a bimorph leaf and the like so that they can be displaced in the direction substantially perpendicular to the tracing direction. Reference numeral 9 designates a drum motor for rotating the rotary upper drum 3 and this drum motor 9 is attached to the rotary upper drum 3 through a rotary shaft 10. Reference letter γ denotes a rotation direction of the rotary upper drum 3.

Figure 2:
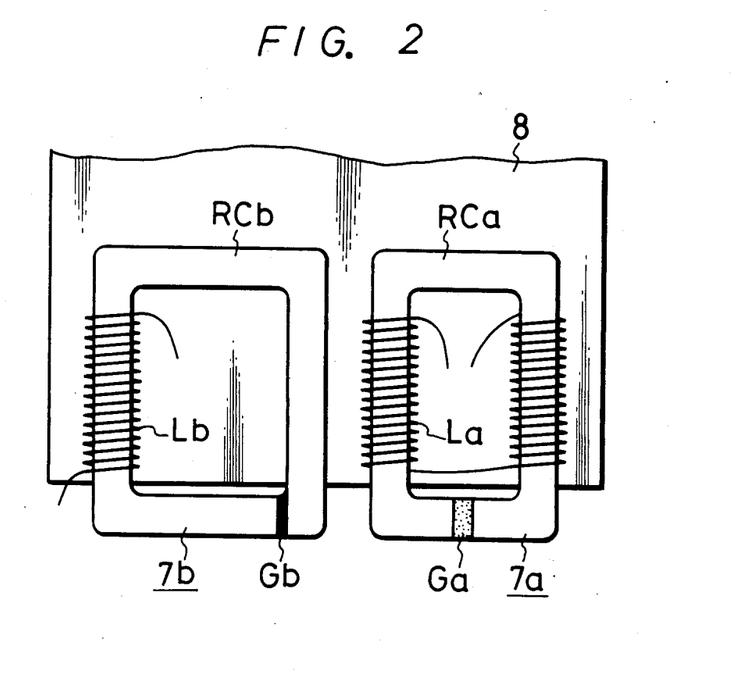
FIGS. 2 and 3 are respectively plan view and front view illustrating a practical construction of magnetic heads used therein.
Figure 3:
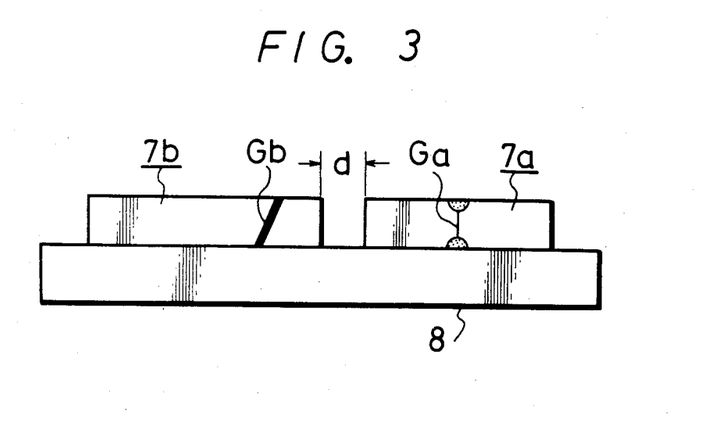

As shown in FIGS. 2 and 3, the magnetic heads 7a and 7b are respectively formed such that a coil La is wound around a ring type core $RC_a$ in a balanced state, while a coil Lb is wound around a ring type core $RC_b$ in a single-sided way. In this case, to avoid a crosstalk between an erase signal and a recording signal, the coil Lb is wound around the leg portion of the core $RC_b$ which is remote from the magnetic head 7a. A gap Ga of the magnetic head 7a is provided at the central portion of the core $RC_a$, while a gap Gb of the magnetic head 7b is formed at one side of the core $RC_b$ and near the magnetic head 7a. The gap Gb of the magnetic head 7b has an azimuth angle relative to the gap Ga of the magnetic head 7a and formed wider than the gap Ga of the magnetic head 7a. A distance d between the opposing portions of the cores $RC_a$ and $RC_b$ is selected to be about 2 mm and the cores $RC_a$ and $RC_b$ are located rather close to each other in position.

Getting back to FIG. 1, the video signal recording and reproducing apparatus of the invention will be described. Reference numeral 11 designates a control magnetic head (a winding type magnetic head). Reference numeral 12 designates a capstan and reference numeral 13 designates a capstan motor which rotates the capstan 12. Reference numeral 14 designates a pinch roller which is made in rotary contact with the capstan 12 through the magnetic tape 1. The magnetic tape 1 is held between the capstan 12 and the pinch roller 14, and when both of them are rotated, the tape 1 is transported at a desired tape speed corresponding to the revolution number of the capstan motor 13 in the direction shown by an arrow α. The video signal recording and reproducing apparatus of this invention may employ a double-capstan system and in that case, the magnetic tape 1 can be moved at desired tape speed in both of the positive and negative directions.

Reference numeral 15 designates a time-base expanding and compressing circuit provided on the recording side and this time-base expanding and compressing circuit 15 is supplied with an input video signal through an input terminal 16. This circuit 15 includes a synchronizing signal separating circuit 15a which is used to separate a vertical synchronizing signal (with frequency 60 Hz in the case of NTSC system) from the input video signal (video signal which is not subjected to time-base expanding and compressing processing) applied to the input terminal 16. This vertical synchronizing signal is a reference synchronizing signal generated from a synchronizing plate and can be obtained both upon recording and reproducing.

Reference numeral 17 designates a servo circuit which is used for the drum motor 9. The drum motor 9 is provided with signal generators {formed of an electrode (magnetized magnet wheel) and a magnetic head (for example, a magnetic flux detecting head of a thin film type)} for generating a frequency signal and a phase signal respectively produced in response to the rotation of the drum motor 9, namely, the rotary upper drum 3. These frequency signal and phase signal are respectively supplied to the servo circuit 17. Further, the servo circuit 17 is supplied with the vertical synchronizing signal (the reference vertical synchronizing signal) from the synchronizing separating circuit 15a of the processing circuit 15. As a result, the rotation of the drum motor 9 is controlled by this servo circuit 17 such that the respective signals from the signal generators of the drum motor 9 may surely be locked in this vertical synchronizing signal.

Reference numeral 18 designates an input terminal which is supplied with a speed command signal to specify the transport speed of the magnetic tape 1 which is generated by operating a depressing button or the like of a speed controller by an operator. The speed command signal from the input terminal 18 is supplied to a microprocessor 19 and a tape transport speed control pulse generator 20 to control them respectively. The pulse derived from the pulse generator 20 is supplied to a servo circuit 21 for the capstan motor 13. Further, the control signal from the microprocessor 19 is supplied to the pulse generator 20.

Reference numeral 22 designates a position detector which is adapted to detect the transport position (the transport position of the magnetic tape in the longitudinal direction) of the magnetic tape 1. This position detector 22 is supplied with a control signal reproduced by the control magnetic transducer head 11 and a frequency signal derived from a frequency signal generator {which consists of a magnetic pole (a magnetized magnet wheel having, for example, 96 magnetic poles around one circumference) and a magnetic transducer head (for example, a magnetic flux detecting head of thin film type)} which is provided in the capstan motor 13 for producing the frequency signal in accordance with the revolution of the motor 13, namely, the capstan 12. In this position detector 22, the running position of the tape 1 is roughly detected by the control signal, while the running position of the tape 1 is finely detected by the frequency signal. The position detecting signal from the position detector 22 is respectively supplied to the microprocessor 19 and the servo circuit 21.

The time-base expanding and time-base compressing circuit 15 on the recording side receives the frequency signal from the frequency signal generator provided in the capstan motor 13 and time-base-expands or time-base-compresses the video signal in response to the frequency of the frequency signal and also corrects the phase of the whole video signal on the basis of the error signal from the capstan servo circuit 21 supplied thereto.

References $SW_1$, $SW_2$ and $SW_3$ respectively designate record/playback change-over switches, each of which has a movable contact m and fixed contacts p and r on the record and playback sides and which are changed in position in association with one another.

Reference numeral 23 designates a head driving circuit which supplies a driving signal through an output terminal 24 to the electro-mechanical transducer element 8 having mounted thereon the rotary magnetic heads 7a, 7b, whereby the magnetic head 7 is displaced in the direction substantially perpendicular to its tracing direction. This head driving circuit 23 receives from the drum servo circuit 17 a flyback pulse and generates, based upon this flyback pulse, a drive signal of triangular wave the phase of which is fixed. In this head driving circuit 23, upon recording, the inclination of the triangular wave drive signal is controlled on the basis of a frequency difference of the frequency signal through the switch $SW_1$ from the frequency signal generator provided in the capstan motor 13, while upon reproducing, the inclination of the triangular wave drive signal is controlled on the basis of a frequency difference of a horizontal synchronizing signal through the switch $SW_1$ from a head displacement control circuit 34 and a tracking error amount of a tracking error signal. Further in this head driving circuit 23, upon recording, the offset level of the triangular drive signal is controlled on the basis of the error amount of the error signal which is supplied thereto through the switch $SW_2$ from the capstan servo circuit 21, while upon reproducing, the offset level of the triangular wave drive signal is controlled on the basis of the phase of the horizontal synchronizing signal which is supplied thereto through the switch $SW_2$ from the head displacement control circuit 34.

A record timing control circuit 30 will be described next. Reference numeral 25 designates an FM (frequency modulation)-modulator and recording amplifier, which receives the video signal derived from the time-base expanding and compressing circuit 15 and FM-modulates such video signal, amplifies the FM-modulated video signal and then supplies the same through the switch $SW_3$, an ouput terminal 26 and a rotary transformer (not shown) to the record/reproduce rotary magnetic head 7a as the record signal. Reference numeral 37 designates an erase signal generating circuit (oscillator) and the erase signal (having the frequency a little lower than that of twice the FM carrier frequency) from which is supplied through an output terminal 38 to the erase rotary magnetic head 7b. The FM-modulator and recording amplifier 25 and the erase signal generating circuit 37 are respectively controlled by a gate signal from a gate signal generator 27, whereby the record/erase timing and the record/erase period are controlled. This gate signal generator 27 is controlled by the microprocessor 19. Reference numerals 28 and 29 respectively designate frame identifying circuits, in which reference numeral 28 designates the odd and even identifying circuit which receives the video signal from the input terminal 16 (also the time-base expanding and time-base compressing circuit 15 is permitted) to identify odd and even fields of the video signal and reference numeral 29 designates a color framing identifying circuit which receives the video signal from the input terminal 16 (also the time-base expanding and time-base compressing circuit 15 is permitted) to identify the color framing of the video signal. The identified outputs from these identifying circuits 28 and 29 are respectively supplied to the microprocessor 19. This microprocessor 19 is also supplied with the vertical synchronizing signal (reference vertical synchronizing signal) from the synchronizing separating circuit 15a of the time-base expanding and time-base compressing circuit 15. Reference numeral 39 designates a detecting circuit, which upon reproducing mode, detects the data from the control signal (including data regarding the color framing corrresponding to each slant track and data regarding odd and even fields) derived from the control head 11. The detected output therefrom is supplied to the microprocessor 19.

The reproduced signal from the record/reproduce rotary magnetic head 7a is supplied through the switch $SW_3$ to a playback amplifier and FM-demodulator 31 in which it is amplified and the FM-modulated video signal is demodulated thereby obtained as the video signal. This video signal is supplied to a time-base expanding and time-base compressing circuit 32 at the playback side thereby corrected in time base and then developed at an output terminal 33.

The horizontal synchronizing signal in the color video signal derived from the playback amplifier and demodulator 31 is supplied to the head displacement control circuit 34. This head displacement control circuit 34 is supplied through input terminals 35 and 36 an envelope signal of the reproduced signal (high frequency signal) from the record/reproduce rotary magnetic head 7a and a distortion detecting signal (a detecting signal for detecting the distortion state of the element 8) from a mechanical-electric transducer element (not shown) such as a strain gauge mounted on the electro-mechanical transducer element 8.

Figure 4:
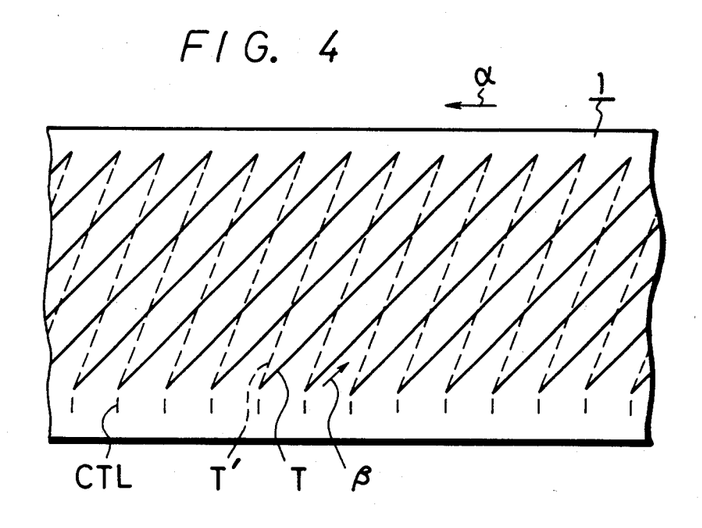
FIGS. 4 and 5 are respectively diagrams showing a recorded pattern on a magnetic tape.

The operation of the video signal recording and reproducing apparatus shown in FIG. 1 upon recording mode will be described with reference to FIG. 4. Each movable contact m of the switches $SW_1$ to $SW_3$ is changed in position to the fixed contact r on the recording side. In this case, let it be considered that the tape 1 is moved at a speed lower than the standard speed Sn, namely, at a speed 1/m the standard speed Sn and then the video signal from the input terminal 16 is recorded on the tape 1. In FIG. 4, reference numeral 1 designates a magnetic tape 1 which is similar to that in FIG. 1, and reference CTL designates a control signal which is recorded beforehand on the tape 1 with an equal spacing. Reference T designates a slant track (shown by a solid line) which is formed by the magnetic head when the tape 1 is moved at the standard speed Sn, and T' designates a slant track (shown by a broken line) which is formed by the magnetic head when the tape 1 is moved at the speed 1/m the standard speed Sn.

By the way, in this video signal recording and reproducing apparatus (video tape recorder), the video signal is recorded such that when the running speed of the tape 1 is (1/m) Sn, the slant track T having the same inclination and length as those of the slant track which is formed when the tape 1 is moved at the standard speed Sn is sequentially formed on the tape 1. In FIG. 4, $\alpha$ indicates the running direction of the tape 1 and $\beta$ indicates the tracing direction of the magnetic head 7.

Therefore, supplied to the input terminal 18 is a speed command signal which commands that the running speed of the tape 1 is (1/m) Sn (m can be selected arbitrarily). Thus, the pulse generator 20 generates a pulse having the frequency of 1/m times the frequency Fn of a pulse which is generated when the tape 1 is moved at the standard speed Sn and this pulse is fed to the capstan servo circuit 21. As a result, the tape 1 is continuously moved at the speed of (1/m) Sn by the capstan 12 and the pinch roller 14. The tape transport speed (1/m) Sn of this tape 1 is not changed until the control signal for changing the tape speed is supplied from the microprocessor 19 to the pulse generator 20.

In this case, the capstan 12 is controlled in rotation such that the tape speed lies within a certain tape speed range which is lower than a standard record and reproduce tape speed, whereby relative to the rotary magnetic head, the tape 1 is moved in position from the position near a certain recorded track to the position of an adjacent track which will be traced next. The control of the capstan at that time must be carried out so as to satisfy the following condition: relative to the rotary magnetic head, the tape 1 is moved to the position of the adjacent track in a short time. In addition, the tape 1 must not pass over the standard track interval and must not overshoot the above position; and the tape speed before and after the tape 1 reaches the position of the adjacent track must become a constant tape speed (including a stop) which is enoughly lower than the standard record and reproduce tape speed.

In the time-base expanding and time-base compressing circuit 15, the input video signal is time-base-expanded such that when the tape 1 is moved at low speed or stopped in running, the unit signal amount, namely, one field amount (one frame is possible) of each input video signal is just recorded on the slant track T shown in FIG. 4. Further in order that the arriving position of the slant track T with the control track CTL on the tape 1 as standard may coincide in timing with the video signal to be recorded on the slant track T, the phase of the video signal which is time-base-expanded is controlled on the basis of the error signal from the capstan servo circuit 21.

The head drive circuit 23 is controlled by the drum servo circuit 17, the frequency signal generator of the capstan motor 13 and the capstan servo circuit 21 to ensure the magnetic heads 7a and 7b to trace the slant track T positively and supplies the drive signal to the electro-mechanical transducer element 8. When the head 7a traces a certain slant track T to record a video signal of a certain field thereon and then traces an adjacent slant track T to record a video signal of the other field, so long as the slant track T is not thoroughly traced only by the displacements of the magnetic heads 7a and 7b, the pulse generator 20 is controlled by the microprocessor 19, whereby the speed of the tape 1 is changed a little from (1/m) Sn so that the magnetic heads 7a and 7b can trace the desired slant track T. Accordingly, the tape 1 is controlled in transportation such that the predetermined slant track T can surely be traced by the heads 7a, 7b which are respectively displaced in a possible range.

In the modulator and record amplifier 25, the on or off state of the record amplifier thereof is controlled by the gate signal from the gate signal generator 27 (which is controlled by the microprocessor 19), whereby it is controlled to supply or not to supply to the record/reproduce head 7a the video signal which is time-base-expanded and time-base-compressed from the time-expanding and time-compressing processing circuit 15. In other words, of the video signals derived from the processing circuit 15, a video signal of one field per integer fields close to m is derived by every one field and then supplied through the switch SW3 to the head 7a.

When a color video signal is recorded on the tape 1, in order that the color video signal is sequentially recorded on each slant track T while keeping the continuity of the color framing, the video signal from the processing circuit 15 is selected by a field unit on the basis of the identification output from the color framing identifying circuit 29.

Further, when a monochromatic video signal is recorded on the tape 1, in order that the monochromatic video signal is sequentially recorded on each slant track T while keeping the continuity of the framing of the odd and even fields, the video signal from the processing circuit 15 is selected by the field unit on the basis of the identification output from the odd and even field identifying circuit 28.

Figures 5, 6:
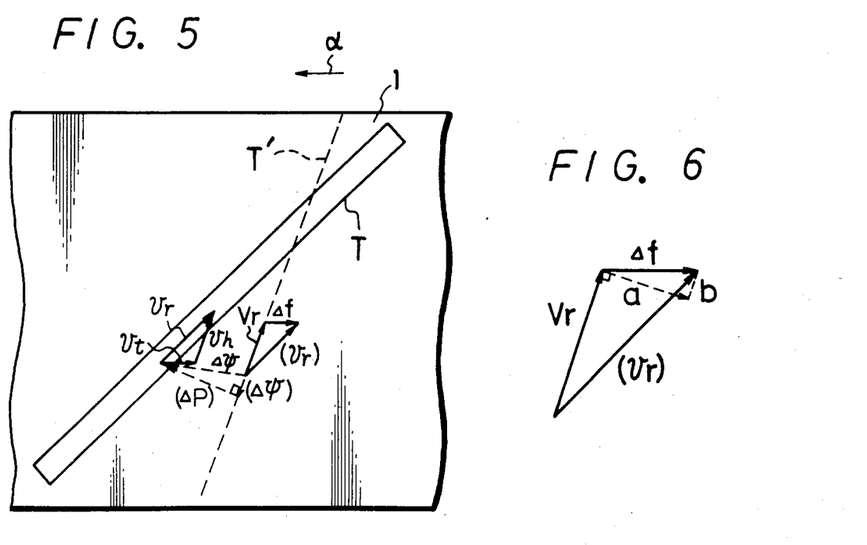
FIG. 6 is a vector diagram useful for explaining the apparatus shown in FIG. 1.

FIGS. 5 and 6 are respectively vector diagrams showing such a case that even if the tape speed and tape position upon recording mode are in any desired state, they can be restored to the normal pattern and recorded by highly controlling a head height vector P and a signal phase vector $\Psi$.

A reference record speed vector $v_r$ is a vector, which results from composing a head tracing speed vector $v_h$ and a tape speed vector $v_t$. If, now, there is a desired record speed vector Vr at a desired position, a vector $(v_r)$ can be obtained by adding a speed correction vector $\Delta f$ to the desired record speed vector Vr.

On the other hand, a position displaced vector $\Delta\Psi$ on the tape 1 can be corrected by composing a video signal phase component vector $(\Delta\Psi)$ and a track vertical direction movable head displaced amount vector $(\Delta P)$.

As is clear from FIG. 6, the speed correction vector $\Delta f$ can be obtained by composing the time differentiation values of $\Delta P$ and $\Delta\Psi$. The speed correction vector $\Delta f$ can be expressed as $\Delta f = \vec{a} + \vec{b}$, in which $a = -(dp/dt)$ and $b = -(d\Psi/dt)$.

Thus, instead of the slant track T' which is formed when the tape 1 is moved at a certain speed (lower than the standard speed), at such speed, it is possible to form the same slant track as that formed when the tape 1 is moved at the standard speed.

A friction force of the tape running system will be described next. Particularly when the tape is stopped or moved in the reverse direction, the problem of friction force becomes fatal to possibility in controlling the tape tension and tape guiding.

For example, in a VTR having a format complying with SMPTE (society of motion picture and television engineer) type C format, let it be assumed that the tape is moved in the positive direction. At that time, a distribution of tension $T(\theta)$ on a tape guide drum can be calculated as $$T(\theta) = T_0 \cdot e^{(\mu\theta - \frac{\mu\theta^2}{2\theta_{max}})}$$

where $T_0$ is the tension at the tape entrance, $\mu$ is the friction coefficient at the fixed portion and $\theta_{max}$ is the whole tape wrapping angle.

Then, the instant the tape is moved in the reverse direction, the distribution of tension $T(\theta)$ is changed thoroughly as in the following equation.

$$T(\theta) = T_1 \cdot \theta \frac{\mu\theta^2}{2\theta_{max}}$$

Let us consider the distribution of tension $T(\theta)$ during a period from the instant the tape is stopped to the time the tape is moving in the reverse direction. Speaking briefly, the distribution of tension is in such a state that the distribution curves can be produced innumerably. That is, when a resilient member contacting with the solid friction surface is distorted by the friction force, the distortion distribution can keep a free distribution state within a range of maximum distribution inclination determined by equivalent friction force and equivalent modulus of elasticity.

For example, the tension distribution at the instant the tape is stopped should belong to either of the above distribution equations. However, should either of or both of tensions at entrance side or exit side of the tape for the tape guide drum be changed in association with the stop of the tape movement, how the tension distribution on the way would be changed? In this case, however, it is not possible to easily obtain a new distribution curve which continuously connects the applied tensions between the entrance side and the exit side.

In other words, a continuous member whose shape is kept by the solid friction presents hysteresis phenomenon so that the shape of the continuous member can have unlimited uncertainty (variety). Further, it may be considered that the hysteresis is erased by external very small vibration, external disturbance and the like and then returned to the ground state.

Accordingly, if the tension distribution on the drum surface exactly the same as that of the standard speed recording mode is desired, the following condition has to be kept. That is, upon recording or just before the recording, the friction direction of the tape must not be changed at all. In order to maintain this condition surely, the signal must be recorded during the time when the tape is moved at low speed or the tape is absolutely inhibited from being overshot but the tape is gradually stopped and the signal must be immediately recorded before the tension is slackened.

By the way, when a signal is recorded on a tape which is continuously moved at low speed, it is generally considered that the normal recording is impossible. And it is normally considered that the signal is recorded on the tape which is either moved at the standard speed or stopped completely. Thus, it has not yet been proposed that the signal is recorded on the tape which is moved at low speed. The video signal recording and reproducing apparatus proposed by the present inventor makes such recording possible.

Upon recording, the movement of the tape is not limited to the constant low speed movement but may be intermittent movement. In this case, in the flow of a signal intended for recording, only one field, one frame or a single block interval of other signal sequence is recorded. After the single block was recorded, the recording is stopped immediately or at least the pause interval is provided. Further after the recording of at least a series of signal blocks was recorded, immediately it is commanded to stop the driving of the capstan, whereby the tape is stopped by a distance shorter than at least the track pitch formed when the recording is continuously carried out at the standard tape speed and the standby mode for awaiting the command which commands the recording of the next track is established at that position. After the standby mode at this standby position, the recording of the next track is carried out by the succeeding recording command.

The operation of the apparatus shown in FIG. 1 in which a part of the video signal recorded on the recorded tape is rewritten by a new video signal will be explained. This recorded tape may be either tape on which the video signal is recorded by the apparatus shown in FIG. 1 when the tape is moved at the low speed or the tape is in the stop mode as mentioned above or tape on which the video signal is normally recorded by the prior art VTR having the SMPTE type C format when the tape is moved at the standard speed.

In FIG. 1, each movable contact m of the change-over switches $SW_1$ to $SW_3$ is changed in position to the fixed contact p on the reproducing side whereby to set the video signal recording and reproducing apparatus in the playback mode. Accordingly, the video signal recorded on the recorded tape is reproduced sequentially for still picture at frame unit and a video signal to be rewritten is determined. In this case, supplied to the input terminal 18 is a tape intermittent move command signal by which the pulse generator 20 generates an intermittent pulse so that the tape 1 is intermittently moved at every two fields, or at every two tracks.

In this case, the head drive circuit 23 is controlled by the drum servo circuit 17 and the head displacement control circuit 34 to drive the electro-mechanical transducer element 8 such that the heads 7a, 7b positively trace the slant track T on which the video signal was recorded under the state that the tape 1 is stopped.

The reproduced signal from the head 7a is supplied through the switch $SW_3$ to the playback amplifier and demodulator 31 in which the FM-modulated video signal is amplified and FM-demodulated. The signal thus processed is supplied to the time-base expanding and time-base compressing processing circuit 32, in which it is corrected in time base and then developed at the output terminal 33, which then is displayed on a monitor television receiver (not shown).

After of the video signals recorded on the recorded tape a portion to be rewritten, for example, a certain video signal of one frame amount is determined, under the state that the tape 1 is stopped in movement, the video signal recording and reproducing apparatus is changed in mode to the recording mode and each movable contact m of the change-over switches $SW_1$ to $SW_3$ is changed in position to the fixed contact r on the recording side. The operation of the apparatus as shown in FIG. 1 upon recording mode is substantially as described above. In this case, however, the video signal of the frame to be rewritten has to be erased prior to the recording. Accordingly, from the erase signal generating circuit 37, the erase signal is generated at timing substantially the same as that of the recording signal and then fed to the erase head 7b.

Under the state that the tape 1 is stopped, the record-/reproduce head 7a and the erase head 7b are driven by the electro-mechanical transducer element 8 to sequentially trace two slant tracks T on which the video signal of one frame to be rewritten is recorded, thus the video signal of one frame being erased and recorded. During this period, over the recording period of the video signal of one frame amount, the head drive circuit 23 produces a head drive signal of constant inclination, which is then fed to the electro-mechanical transducer element 8.

When the color video signal is rewritten and recorded on the recorded tape 1, in order that the color video signal is sequentially recorded in each slant track T, keeping the continuity of the color framing, the video signal from the processing circuit 15 is selected at field unit on the basis of the color framing data of the recorded video signal detected by the detecting circuit 39.

Further, when the monochromatic video signal is recorded on the recorded tape 1, in order that the monochromatic video signal is sequentially recorded on each slant track T, keeping the continuity of the odd and even framing of the field, the video signal from the processing circuit 15 is selected at field unit on the basis of the odd and even data of the field of the recorded video signal detected by the detecting circuit 39.

After the video signal was rewritten and recorded on the recorded tape 1, if the video signal recording and reproducing apparatus is again changed to the playback mode under the state that the tape 1 is maintained in the stop mode, the video signal thus rewritten and recorded can be reproduced as the still picture and it can be checked. It is needless to say that the video signal thus rewritten and recorded can be rewritten and then recorded over and over.

The number (for example, two) of the rotary magnetic head, the wrapping angle (for example, 180°) of the magnetic tape around the tape guide drum and the like are not limited to those in the above example but may respectively be selected desirably.

The record and reproduce rotary magnetic head is not limited to a rotary magnetic head which is served as both recording and playback but may be independent magnetic heads. In this case, the electro-mechanical transducer element on which these heads are attached may be made common or independent ones.

The above video signal recording and reproducing apparatus is particularly suitable for forming a master tape of a video disc, an animation picture, a still picture file and the like.

Figure 7:
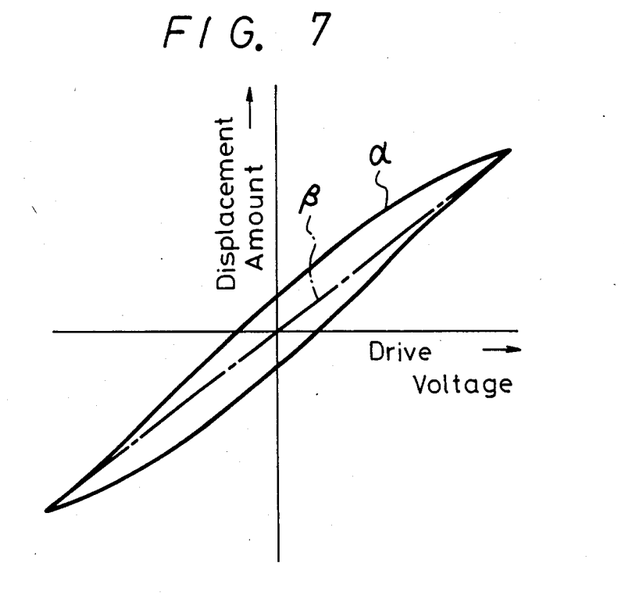
FIG. 7 and FIGS. 8A and 8B are respectively graphs showing electro-mechanical transducer characteristic.
Figure 8A:
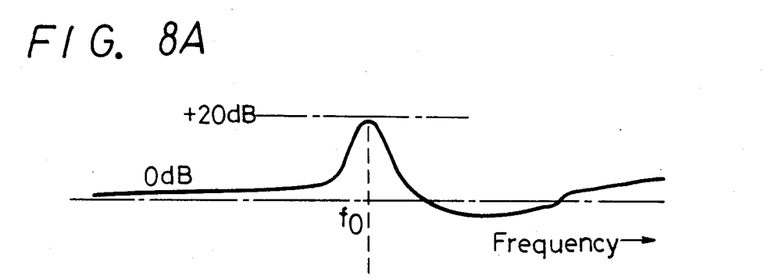
Figure 8B:
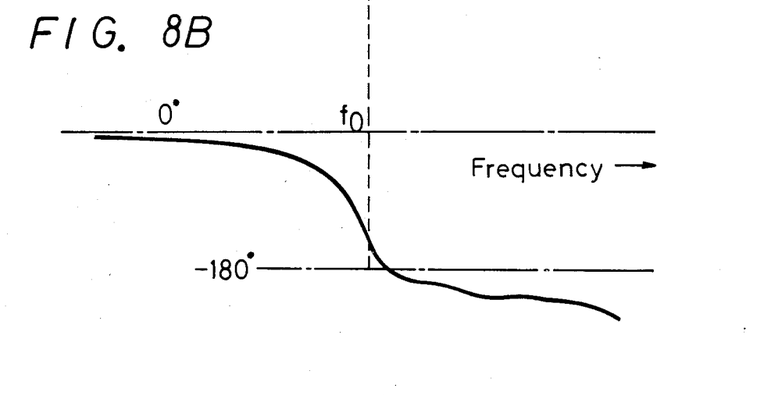

The electro-mechanical transducer element 8 made of a bimorph leaf which displaces the above rotary magnetic heads 7a, 7b in the direction substantially perpendicular to their tracing direction has a drive current vs. displacement amount characteristic which is such hysteresis characteristic as shown by a curve a in FIG. 7. Also the drive voltage vs. displacement amount characteristic is strongly affected by the propagating-wave vibration to have a fundamental natural resonance frequency $f_0$ a phase rotation relative to the frequency of the drive voltage as shown in FIGS. 8A and 8B.

A position control circuit for a magnetic head which is applied to the video signal recording and reproducing apparatus shown in FIG. 1 will be described with reference to FIG. 9. The electro-mechanical transducer element 8 is made of a bimorph leaf, attached at its one end to the fixed portion of the rotary upper drum 3 and provided at its free end with the magnetic heads 7a and 7b. Attached on both surfaces of the electro-mechanical transducer element 8 are made of the bimorph leaf are mechanical-electric transducer elements (mechanically distortion detecting elements and displacement detecting elements) 40 and 41, each of which is formed of a strain gauge. The both detected outputs from these mechanical-electric transducer elements 40 and 41 are differentially supplied through a bridge circuit BR to a differential amplifier 44. References +B and −B respectively designate positive and negative power sources and reference numerals 42 and 43 respectively designate resistors which forms the bridge circuit BR in cooperation with the mechanical-electric transducer elements 40 and 41. Thus, the outputs produced at the diagonal points of the bridge circuit BR are differentially supplied to the differential amplifier 44.

The output of the differential amplifier 44 is supplied through composers (subtracters) 46 and 47 to an integrating amplifier (integrator) 48. The output from the integrator 48 is supplied through a notch filter 49 to a driving amplifier (driving circuit) 50. Then, the drive voltage from the driving amplifier 50 is supplied to the electrodes of the electro-mechanical transducer element 8 which is formed of the bimorph leaf.

Reference numeral 45 designates a displacement control circuit for a recording mode and the displacement control signals therefrom are respectively supplied to the subtracters 46 and 47. This displacement control circuit 45 includes a pattern linearity correcting signal generating circuit 45A and a head displacing signal generating circuit 45B. The respective signals therefrom are respectively supplied to the subtracting circuits 46 and 47, in which the output of the differential amplifier 44 is subtracted from the outputs of the circuits 45A and 45B. The circuit 45A consists of a memory (RAM (random access memory) or ROM (read-only memory)) in which the program how the magnetic heads 7a, 7b trace the tape 1, a D/A (digital-to-analog) converter which D/A-converts the read-out output from the memory and their peripheral circuits. The output from the D/A converter is supplied to the subtracter 46. The circuit 45B generates the position correcting signal (triangular wave signal) which corrects the inclination of the tracing locus (recorded track) of the magnetic heads 7a, 7b for the tape 1 and which corrects the position of the magnetic heads 7a, 7b at the beginning of the tracing locus in the longitudinal direction of the tape 1. This signal is supplied to the subtracter 47.

The mechanical-electric transducer elements 40 and 41, each being formed of the strain gauge, form the bridge circuit BR in cooperation with the resistors 42 and 43 as described before and the outputs produced at the diagonal points of the bridge circuit BR are respectively supplied to the differential amplifier 44 differentially so that the differential amplifier 44 produces at its output side the displacement detected output having no distortion and good linearity of the electro-mechanical transducer element 8, namely, the displacement detected output of the magnetic heads 7a and 7b.

The integrating amplifier 48 is the compensator which gives sufficient gain to a signal in the low frequency region including a DC current and its slope characteristic is 6 dB/oct.

Figure 11:
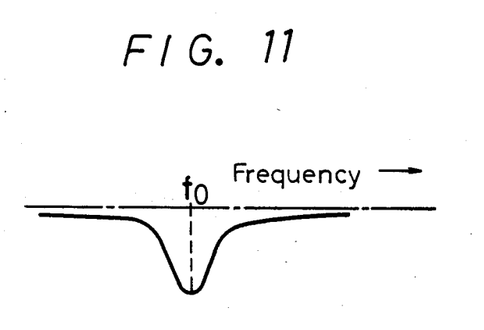
FIG. 11 is a graph indicating a characteristic of a notch filter used in this invention.

As shown in FIG. 11, the notch filter 49 has the center frequency which is equal to the fundamental natural resonance frequency $f_0$ (for example, 1.3 KHz) of the electro-mehanical transducer element 8 made of the bimorph leaf and the notch-type characteristic having a relatively narrow width at both sides of the center frequency. The transfer function F(s) of this notch filter 49 is expressed by the following equation.

$$F(s) = \frac{As^2 + Bs + 1}{Cs^2 - Ds + 1}$$

Figure 10:
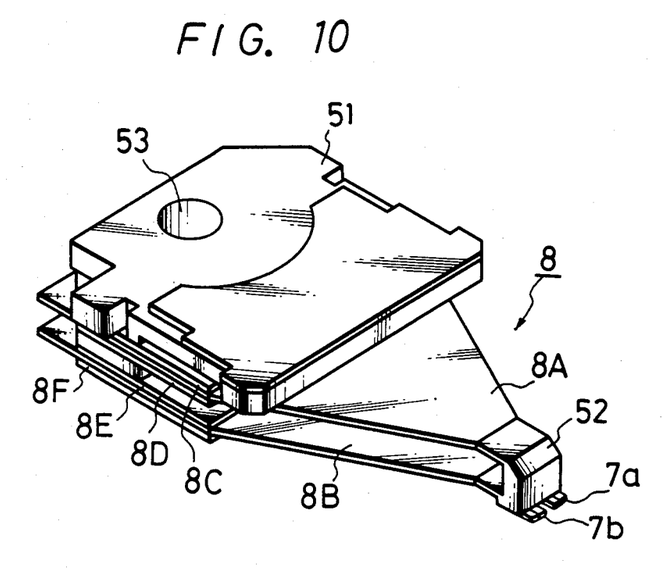
FIG. 10 is a perspective view showing an example of an electro-mechanical transducer element having attached thereon the magnetic head.

FIG. 10 shows an example of a practical construction of the electro-mechanical transducer element 8 made of the bimorph leaf. The tip ends of two bimorph leaves 8A and 8B of substantially pentagon shapes which are disposed substantially in parallel to each other are attached to a head support member 52 of U-shape in cross section to which the magnetic heads 7a, 7b are attached. The respective rear portions of the bimorph leaves 8A and 8B are gripped by other bimorph leaves 8C, 8D and 8E, 8F, and the whole of these bimorph leaves 8A to 8F is attached to a head base plate 51. Reference numeral 53 designates a screw bore and the head base plate 51 is screwed into the rotary upper drum 3 (see FIG. 1).

The operation of the displacement driving circuit or apparatus for the magnetic head shown in FIG. 9 will be described with reference to FIGS. 12A and 12B. In FIG. 9, when the output of the displacement control circuit 45 is selected to be a signal having a constant level (0 dB) regardless of the change of the frequency, the frequency characteristic (absolute value gain characteristic) of the output signal from the differential amplifier 44 when the output side of the differential amplifier 44 is cut out (open loop) is shown by a curve a in FIG. 12A, while the frequency characteristic (absolute value gain characteristic) of the output signal from the differential amplifier 44 when the output side of the differential amplifier 44 is connected to the subtracter 46 as shown in FIG. 9 (closed loop) is shown by a curve b in FIG. 12A.

Figure 12A:
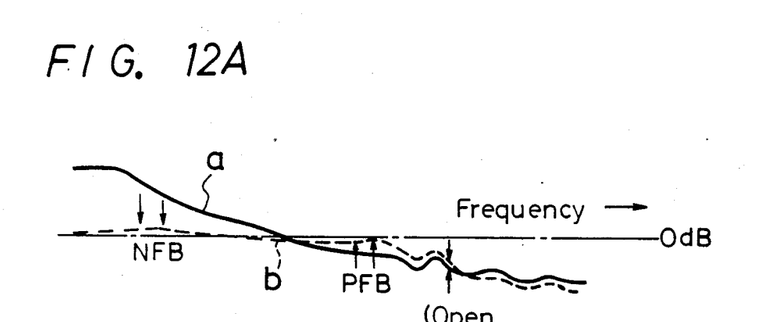
FIGS. 12A and 12B are respectively graphs indicating a characteristic of a negative feedback loop of this invention.
Figure 12B:
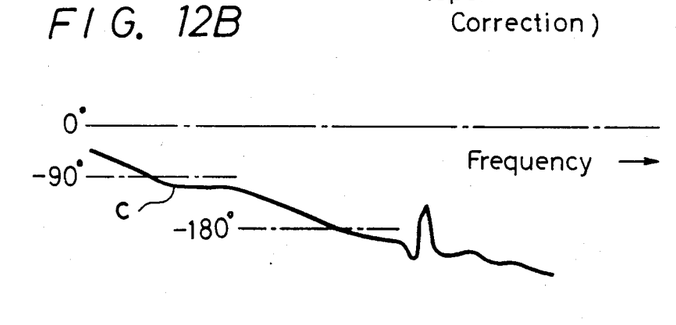

Further, a curve c in FIG. 12B indicates the frequency characteristic of the phase of the output signal from the differential amplifier 44 in the case of the open loop and closed loop when the phase of the output signal from the displacement control circuit 45 is selected to be 0°.

Figure 9:
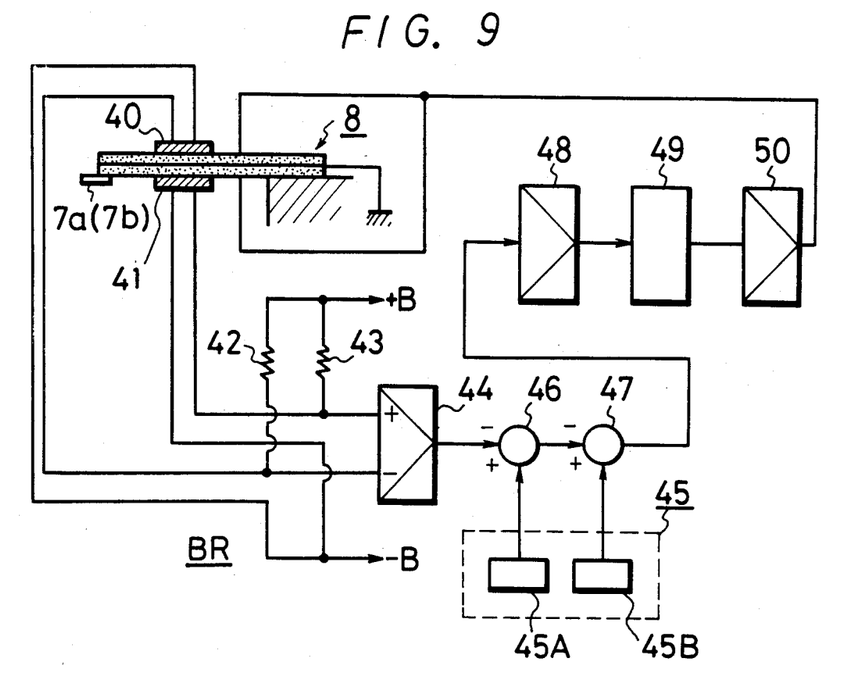
FIG. 9 is a block diagram showing an embodiment of a driving apparatus for displacing a magnetic head according to this invention.

In the apparatus shown in FIG. 9, due to the closed loop, the frequency characteristic of the absolute gain becomes substantially flat at the frequency range less than the frequency $f_0$ as shown by the curve b in FIG. 12A. That is, due to the existence of the integrating amplifier (integrator) 48, the electro-mechanical transducer element 8 is applied with sufficient negative feedback (NFB) in the low frequency range so that the low frequency portion of the curve b is lowered in level relative to the low frequency portion of the curve a and becomes flat. Further, in the middle frequency range, the electro-mechanical transducer element 8 is applied with the positive feedback (PFB) by the phase inversion of the gain so that the middle frequency portion of the curve b is raised in level relative to the middle frequency portion of the curve a and becomes flat.

When the integrating amplifier 48 is inserted into the closed loop, there may be such a fear that the frequency characteristic of the gain is deteriorated. In this case, since the notch filter 49 is inserted into the closed loop, the inherent resonance of the electro-mechanical transducer element 8 can be suppressed by the open loop correction and also the deterioration of the frequency characteristic of the gain (secondary deformation of the displacement of the magnetic heads 7a and 7b) can be suppressed. Furthermore, when the gain of the integrating amplifier 48 is appropriately adjusted, it is possible to adjust the level of the flat characteristic of the curve b.

Figure 13:
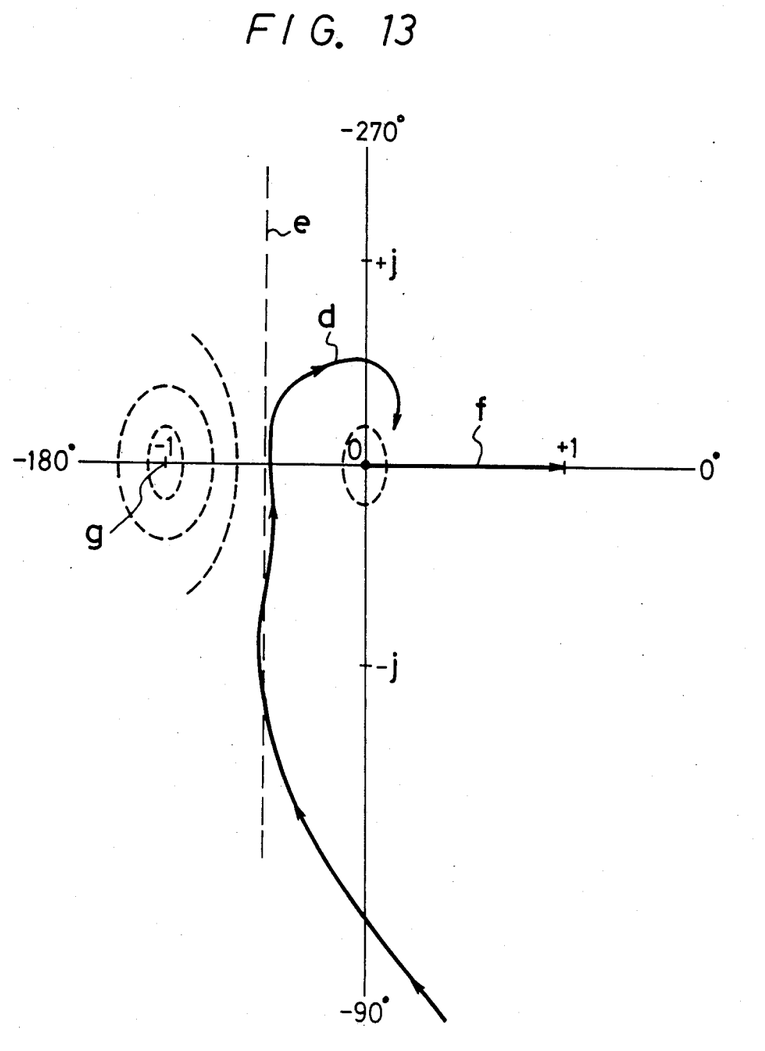
FIG. 13 is a graph indicating a Nyquist frequency of the feedback loop.

The fact that the frequency characteristic of the gain at the frequency range less than the center frequency $f_0$ becomes flat as shown by the curve b in FIG. 12A is made clear from a Nyquist diagram of FIG. 13. In FIG. 13, the abscissa indicates the real number portion of the gain and the ordinate indicates the imaginary number portion thereof. In FIG. 13, a curve d indicates the locus of the open loop gain vector (the frequency becomes high in the direction of the arrow). When this locus passes near a contour line e in which the absolute value of the closed loop gain is 1, it is possible to obtain a closed loop gain characteristic the frequency characteristic of which is flat. This is because the frequency characteristic of the gain is made flat by the positive feedback. Further, since the negative feedback is applied at the low frequency range, nonlinearity and hysteresis characteristic (as shown by the curve $\alpha$ and the straight line $\beta$ in FIG. 7) can be improved. The positive feedback does not exert a bad influence upon such improvement, and since the positive feedback is applied at the middle frequency range, it becomes possible to apply sufficient negative feedback at the low frequency range.

In FIG. 13, reference f denotes a reference vector, g an oscillation area and a broken line indicates a contour line of absolute value of gain in the closed loop.

As set forth above, since the frequency characteristic of gain in the closed loop in FIG. 9 is made substantially flat at the frequency range less than the fundamental natural resonance frequency $f_0$ of the electro-mechanical transducer element 8, it is possible to displace and drive the magnetic heads 7a and 7b with high accuracy, thus the beginning of the record track in the longitudinal direction of the tape 1, the inclination of the recorded track, the linearity of the inclination thereof and the length of the track being controlled to become desired ones.

The above description is given on a single preferred embodiment of the invention, but it will be apparent that many modifications and variations could be effected by one skilled in the art without departing from the spirits or scope of the novel concepts of the invention, so that the scope of the invention should be determined by the appended claims only.

I claim as my invention:

1. Apparatus for recording a video signal on a recording tape by recording head means scanning across said tape at a standard head speed, said video signal being recorded in a standard format consisting of successive parallel slant tracks having a standard pitch and a standard inclination relative to a longitudinal direction of said tape so that said video signal may be reproduced in a reproducing mode of said apparatus as said tape is moved at a standard tape speed and as said recording head means scans at said standard head speed, said apparatus comprising:

moveable head mounting means carrying said recording head means and being deflectable in a direction substantially perpendicular to the direction of said scanning;

means for controlling said tape speed in response to a speed reference signal to obtain a specified tape speed during recording different from said standard tape speed; and     position control means acting on said head mounting means for controlling a position of said recording head means so that said slant track which is formed by said recording head means as said tape is moved at said specified tape speed has an inclination relative to a longitudinal direction of said tape equal to said standard inclination.

2. Apparatus according to claim 1, in which said position control means includes means for generating a control voltage which is supplied to said head mounting means, a magnitude of said control voltage being proportional to a distance scanned across said tape and to the difference between said specified tape speed and said standard tape speed, said head mounting means being displaced by an amount determined by said magnitude of said control voltage.

3. Apparatus according to claim 2, in which said position control means further includes means for detecting the displacement of said head mounting means in response to said control voltage to generate an output voltage corresponding to said displacement, means connected with said displacement detecting means for integrating said output voltage, and means for supplying the integrated output voltage to said head mounting means in addition to said control voltage to form a negative feedback loop.

4. Apparatus according to claim 3, in which said head mounting means includes bimorph leaf means and said displacement detecting means comprises strain gauge means attached on a surface of said bimorph leaf means.

5. Apparatus according to claim 4, in which said strain gauge means includes a pair of strain gauges attached to opposed surfaces of said bimorph leaf means, the respective strain gauges being connected in series with respective resistors, and said output voltage being generated from connecting points between the respective strain gauges and the respective resistors.

6. Apparatus according to claim 3, in which said position control means further includes notch filter means connected in series with said integrating means, said notch filter means having a center frequency which substantially corresponds to a resonance frequency of said head mounting means.

7. Apparatus according to claim 6, in which said integrating means has a cutoff frequency selected to reduce a gain of said output voltage in a frequency range lower than said resonance frequency.

8. Apparatus according to claim 1, further comprising means for time-expanding or time-compressing said video signal to be recorded in response to a difference between said specified tape speed and said standard tape speed.

* * * * *